(12) United States Patent
Roudonis

(10) Patent No.: US 10,059,091 B2
(45) Date of Patent: Aug. 28, 2018

(54) PARTITION

(71) Applicant: ORBIS Corporation, Oconomowoc, WI (US)

(72) Inventor: Robert Anthony Roudonis, Frankfort, KY (US)

(73) Assignee: ORBIS Corporation, Oconomowoc, WI (US)

( * ) Notice: Subject to any disclaimer, the term of this patent is extended or adjusted under 35 U.S.C. 154(b) by 115 days.

(21) Appl. No.: 15/052,504

(22) Filed: Feb. 24, 2016

(65) Prior Publication Data

US 2016/0250839 A1    Sep. 1, 2016

Related U.S. Application Data

(60) Provisional application No. 62/126,201, filed on Feb. 27, 2015.

(51) Int. Cl.
*B32B 5/00* (2006.01)
*B32B 5/08* (2006.01)
(Continued)

(52) U.S. Cl.
CPC ............ *B32B 38/10* (2013.01); *B32B 5/00* (2013.01); *B32B 5/022* (2013.01); *B32B 5/08* (2013.01); *B32B 5/18* (2013.01); *B32B 5/245* (2013.01); *B32B 5/26* (2013.01); *B32B 7/12* (2013.01); *B32B 27/065* (2013.01); *B32B 27/12* (2013.01); *B32B 27/32* (2013.01); *B32B 27/34* (2013.01); *B32B 27/36* (2013.01); *B32B 27/365* (2013.01); *B32B 37/0053* (2013.01); *B32B 37/12* (2013.01); *B32B 38/0004* (2013.01); *B32B 2037/1276* (2013.01); *B32B 2250/40* (2013.01); *B32B 2255/10* (2013.01); *B32B 2255/26* (2013.01); *B32B 2262/0253* (2013.01); *B32B 2262/0261* (2013.01); *B32B 2262/0276* (2013.01); *B32B 2262/14* (2013.01); *B32B 2266/025* (2013.01); *B32B 2270/00* (2013.01); *B32B 2307/3065* (2013.01); *B32B 2307/514* (2013.01); *B32B 2307/54* (2013.01); *B32B 2307/554* (2013.01); *B32B 2307/7145* (2013.01); *B32B 2307/726* (2013.01); *B32B 2307/73* (2013.01); *B32B 2307/734* (2013.01);
(Continued)

(58) Field of Classification Search
USPC ......... 156/247, 249, 250, 269, 307.1, 307.3, 156/307.7
See application file for complete search history.

(56) References Cited

U.S. PATENT DOCUMENTS 2,459,301 A    1/1949   Adams
2,701,635 A    2/1955   Mills
(Continued)

FOREIGN PATENT DOCUMENTS

CA    2797383 A1    6/2013
EP    1435326       7/2004

OTHER PUBLICATIONS

Photographs of prior known divider/container; publication date unknown (3 pages).

*Primary Examiner* — Sing P Chan
(74) *Attorney, Agent, or Firm* — Greensfelder, Hemker & Gale, P.C.

(57) ABSTRACT

A partition is disclosed having a two sided lamination thereon for protecting products in containers and bins.

17 Claims, 2 Drawing Sheets

(51) Int. Cl.
*B32B 5/26* (2006.01)
*B32B 7/12* (2006.01)
*B32B 27/12* (2006.01)
*B32B 27/32* (2006.01)
*B32B 27/34* (2006.01)
*B32B 27/36* (2006.01)
*B32B 37/00* (2006.01)
*B32B 38/00* (2006.01)
*B32B 38/10* (2006.01)
*B32B 37/12* (2006.01)
*B32B 5/18* (2006.01)
*B32B 5/02* (2006.01)
*B32B 5/24* (2006.01)
*B32B 27/06* (2006.01)

(52) U.S. Cl.
CPC ....... *B32B 2323/10* (2013.01); *B32B 2435/02* (2013.01); *B32B 2553/00* (2013.01); *B32B 2571/00* (2013.01)

(56) References Cited

U.S. PATENT DOCUMENTS

| | | | |
|---|---|---|---|
| 3,607,531 A * | 9/1971 | Small | B29C 65/20 156/251 |
| 3,885,668 A | 5/1975 | McClain | |
| 3,971,468 A | 7/1976 | Helms et al. | |
| 4,436,215 A | 3/1984 | Kleinert et al. | |
| 5,427,446 A | 6/1995 | Glomski | |
| 6,984,445 B1 * | 1/2006 | Yamagata | B29C 44/1209 156/79 |
| 7,344,043 B2 | 3/2008 | Nyeboer | |
| 7,344,044 B2 | 3/2008 | Bradford et al. | |
| 7,410,094 B2 | 8/2008 | Bos | |
| 7,428,975 B2 | 9/2008 | Bradford | |
| 7,878,362 B2 | 2/2011 | Nyeboer | |
| D639,560 S | 6/2011 | Brown et al. | |
| 8,360,306 B2 | 1/2013 | Vroon | |
| 8,419,883 B2 * | 4/2013 | Day | B29C 44/1285 156/169 |
| 2001/0052146 A1 * | 12/2001 | Garneau | A41D 1/084 2/455 |
| 2003/0084914 A1 * | 5/2003 | Simon | A45D 34/04 132/333 |
| 2006/0062955 A1 * | 3/2006 | Liu | B32B 7/12 428/40.1 |
| 2006/0247112 A1 | 11/2006 | Bradford | |
| 2007/0056682 A1 * | 3/2007 | Yamada | G02B 5/3083 156/249 |
| 2008/0017309 A1 * | 1/2008 | Bradford | B29C 66/542 156/308.2 |
| 2008/0032611 A1 * | 2/2008 | Dilyard | B24D 11/00 451/344 |
| 2008/0105687 A1 | 5/2008 | Nyeboer | |
| 2008/0128428 A1 | 6/2008 | Beckerman | |
| 2012/0223083 A1 | 9/2012 | Hug | |
| 2013/0102450 A1 | 4/2013 | Vroon | |
| 2013/0207413 A1 * | 8/2013 | Lookebill | B62D 33/048 296/182.1 |

* cited by examiner

PARTITION

CROSS-REFERENCE TO RELATED APPLICATIONS

The present invention claims the benefit of U.S. Provisional Patent Application No. 62/126,201 filed Feb. 27, 2015, the contents of which is incorporated herein in its entirety by reference and made a part hereof.

FEDERALLY SPONSORED RESEARCH OR DEVELOPMENT

N/A

FIELD OF THE INVENTION

The present invention relates to dunnage and, in particular, partitions used to form such dunnage in containers for storage and transporting items.

BACKGROUND

It is common practice to divide the interior of a crate or container into a plurality of individual compartments. The compartments are formed by a series of interconnected parallel and perpendicular dividers. Specifically, one set of parallel dividers runs side to side while the other set of parallel dividers runs end to end, perpendicular to the other set of dividers. Each divider has slots cut therein to facilitate the interconnecting thereof to form the latticework.

Once set up the components to be separated are put into the individual compartment for storage and transporting. The dividers can be made of different materials, such as cardboard, plastic, or paperboard corrugations. Generally, the dividers or partitions need to be rigid so as to ensure the goods, components, or items are maintained separate from one another in the container. In addition, the items can be wrapped in bubble wrap, cloth, etc. to protect them from moving around and to act as a buffer. However, the partitions may contact the goods being stored therein and damage the goods.

SUMMARY OF THE INVENTION

The partition of the present invention is a Class A surface protection partition material. Class A surface is a term used in automotive design to describe a set of freeform surfaces of high efficiency and quality. Parts having these surfaces must be protected. To address the unique challenges involved with the packaging of Class A surface parts, Applicant created rigid partitions which can support the weight of parts, while still having the flexibility needed to create curved cells for parts with unique geometry that are difficult to package with traditional materials.

The product requires limited processing before it is converted into dunnage sets, streamlining dunnage design and fabrication with simple die-cut and assembly operations. It is uniformly composed of closed-cell foam, making it water resistant, less susceptible to dust contamination due to static charge and free of fibers and adhesives on its surface that can trap particles or wear off onto parts like other materials in the marketplace. Besides the superior protective properties that its soft foam surface provides, the partition is ergonomically friendly and offers workers superior comfort when handling the parts from their packaging. It improves worker safety by protecting workers' cuticles and fingertips since it does not have the sharp edges that are common found on corrugated dividers.

BRIEF DESCRIPTION OF THE DRAWINGS

To understand the present invention, it will now be described by way of example, with reference to the accompanying drawings and attachments in which.

DETAILED DESCRIPTION

Figure 1:
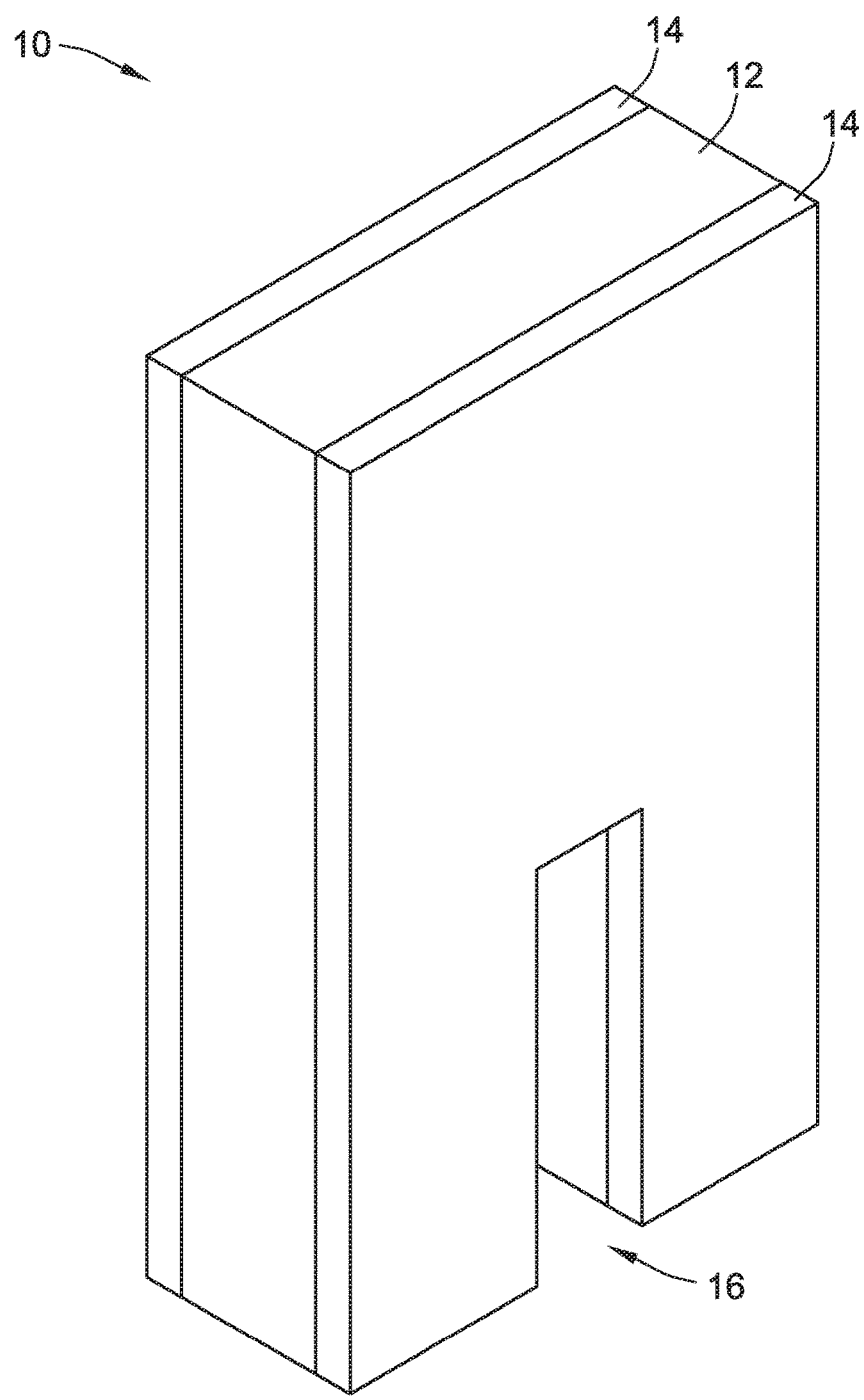
FIG. 1 is an exemplary laminate with the sizes exaggerated.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

An exemplary partition 10 is shown in FIG. 1 having a three-layered structure with a board or stock base inner layer 12 with a sheet 14 attached to opposed outer surfaces of the inner layer. The partition is generally rectangular but could have other shapes such as circular, oval or polygonal without departing from the scope of the present invention. It is contemplated having a layered structure of only two layers where only a single sheet 14 is attached to the inner layer. Further, it is contemplated using additional layers such that the partition can have from two layers to say ten layers, for example. The sheets 14 can be of the same or of different material. The sheets can be a single-layer structure, a multiple-layer structure or a multiple-web structure where individual plies are connected about a peripheral edge and inner faces of the plies are not connected. Preferably the outer sheet or sheets 14 are attached to the inner layer 12 using a lamination process detailed below. Preferably the outer sheets 14 cover the entire face of each side of the inner sheet 12 (side to side and top to bottom). Typically, one or more slots 16 are cut into the partition 10 for cooperating or interconnecting with other partitions that in total form the dunnage in a crate or container.

The inner layer 12 is preferably of a low density so that the partition is light-weight, somewhat rigid material when dimensioned to be used as a partition, has sufficient dimensional stability to be held at one end without significant folding or creasing of the inner layer under the force of gravity. Additionally, the inner layer will have a suitable or low durometer to act as a cushion for materials that contact the partition. One suitable material is a foamed or expanded polymer such as expanded polyolefin and more preferably an expanded polypropylene (EPP). This is a plastic foam sheet designed for lightweight, energy management and cushioning applications. It has been shown to be an excellent energy absorbing material that withstands multiple impacts without damage. It is further light weight and exceptionally high strength-to-weight ratio making it a good choice for applications such as vehicle crash protection components. It can be used in energy absorbing packaging for even the heaviest of industrial applications. Additionally, it further has a very high strength-to-weight ratio providing load bearing structural support in a range of applications. It is capable of handling significant loads with little loss in form or shape.

Unaffected by exposure to oil, grease, petroleum, and most chemicals, EPP does not support microbial growth. EPP provides effective thermal insulation for applications where food, medical supplies and other temperature sensitive products require protection. EPP's strong thermal insulation properties combined with key assets such as resilience and complex-shape moldability make it ideal for use in HVAC applications. EPP is an environmentally sound, material that is 100% recyclable. Manufacturing EPP requires no VOCs (Volatile Organic Compounds), chlorofluorocarbon or other compounds that are recognized as most damaging to the environment. One such source of EPP is ARPRO® by JSP International SARL and JSP Corporation.

Numerous materials can be used for the outer sheet or sheets 14. They include polyamides, polyesters, polyolefins, polyvinyl chloride (PVC), and polycarbonate (PC). Suitable polyamides include those formed from a reaction of a diamine with a dicarboxylic acid, a ring-opening reaction of a caprolactam, and other techniques well known to those of ordinary skill in the art. Suitable polyamides include nylons, for example, $nylon_{6,6}$, $nylon_6$, and others. Suitable polyesters include aliphatic, semi-aromatic and aromatic-types.

Suitable polyesters can be homopolymers or copolymers, thermoplastic and thermoset. Most preferably, the polyester is a brushed polyester fabric.

Suitable polyolefins include homopolymers and copolymers of ethylene, propylene, butylene, hexene, heptene, octene, and combinations thereof. More preferably, suitable polyolefins include non-oriented, uni-axially oriented, and biaxially-oriented polyolefins (collectively "oriented"), and most preferably oriented polypropylene. Other suitable polyolefins include homopolymers of polyethylene including low density polyethylene (LDPE) and high density polyethylene (HDPE) including the HDPE sold under the tradename TYVEC®. Suitable polyolefins can also include copolymers of ethylene with alpha-olefins having from three to eight carbons and including linear low density polyethylene (LLDPE), and ultra-low density polyethylene (ULDPE). In one preferred form of the invention, the polyolefins can be manufactured using catalysts such as vanadium-type catalyst, metallocene or other type of catalyst well known to those of ordinary skill in the art. The sheets 14 can be formed into a single-layer, a multiple-layer, or a multiple-ply sheet using extrusion, coextrusion, lamination, extrusion lamination, and other techniques well known to those of ordinary skill in the art. The sheets 14 can also be non-woven which means a web or sheet of fibers bonded together by entangling fiber or filaments mechanically, thermally or chemically. They are flat, porous sheets that are made directly from separate fibers. They are not made by weaving or knitting and do not require converting the fibers to yarn. An example of one such non-woven sheet is made from a brushed polyester material with an adhesive coat and is sold by OXCO with an adhesive coated manufactured by Kapco (Kent Adhesive Products Company) of Kent, Ohio.

Nonwoven fabrics have replaced many traditional textiles due to superior properties and efficient manufacturing processes. Most nonwovens can be effectively produced and finished to have specific benefits such as flame retardancy, high liquid absorbency, liquid repellency, high tensile strength, bacterial resistance, abrasion resistance, softness and combinations of the same.

Pursuant to OXCO, nonwovens are engineered for disposable, reusable and permanent applications. Spunbond nonwovens are created by polymer chips being introduced into an extruder which produces continuous filaments that are cooled and stretched to give them strength. The filaments are then laid on a moving belt to form a web that is then thermally bonded between two temperature controlled steel rolls. Some bonding rolls have a pattern that is embossed into the web. Spunbonds are typically made from homopolymers such as polypropylene, polyester, polyethylene, or nylon. Some spunbonds are made from two polymer families creating a bi-component fabric.

Further, with respect to spunlaced nonwovens, baled staple fiber is introduced to a carding machine to create a batt. The batt of unbonded fibers is then transferred via a mesh conveyor or perforated cylinders where it is processed through a high pressure water system that entangles the fibers to create the finished product. Fibers blends and finishes can vary depending on desired properties.

In addition with respect to needlepunch nonwovens, baled staple fibers are introduced to a carding machine that distributes the fibers based on the desired basis weight. The batt of fiber is then needled by an oscillating needle board. The fibers are mechanically bonded by barbed needles entangling the fibers. The density of the fabric is controlled by the number of needle boards used.

In one form of the invention, the outer layer(s) 14 is a brushed fabric with an adhesive coat of Dyna-Tech DyTech 6154 adhesive on a 4.6 mil L-3 release liner (48 inches× 1500 feet (approx.)) on a 3" core. It is wound with the inner side out. DyTac 6154 is a solvent free rubber-resin emulsion. It has been formulated to provide the water-based coater with an aggressive, high shear product for numerous tape and industrial pressure sensitive fabrication and assembly applications.

Figure 2:
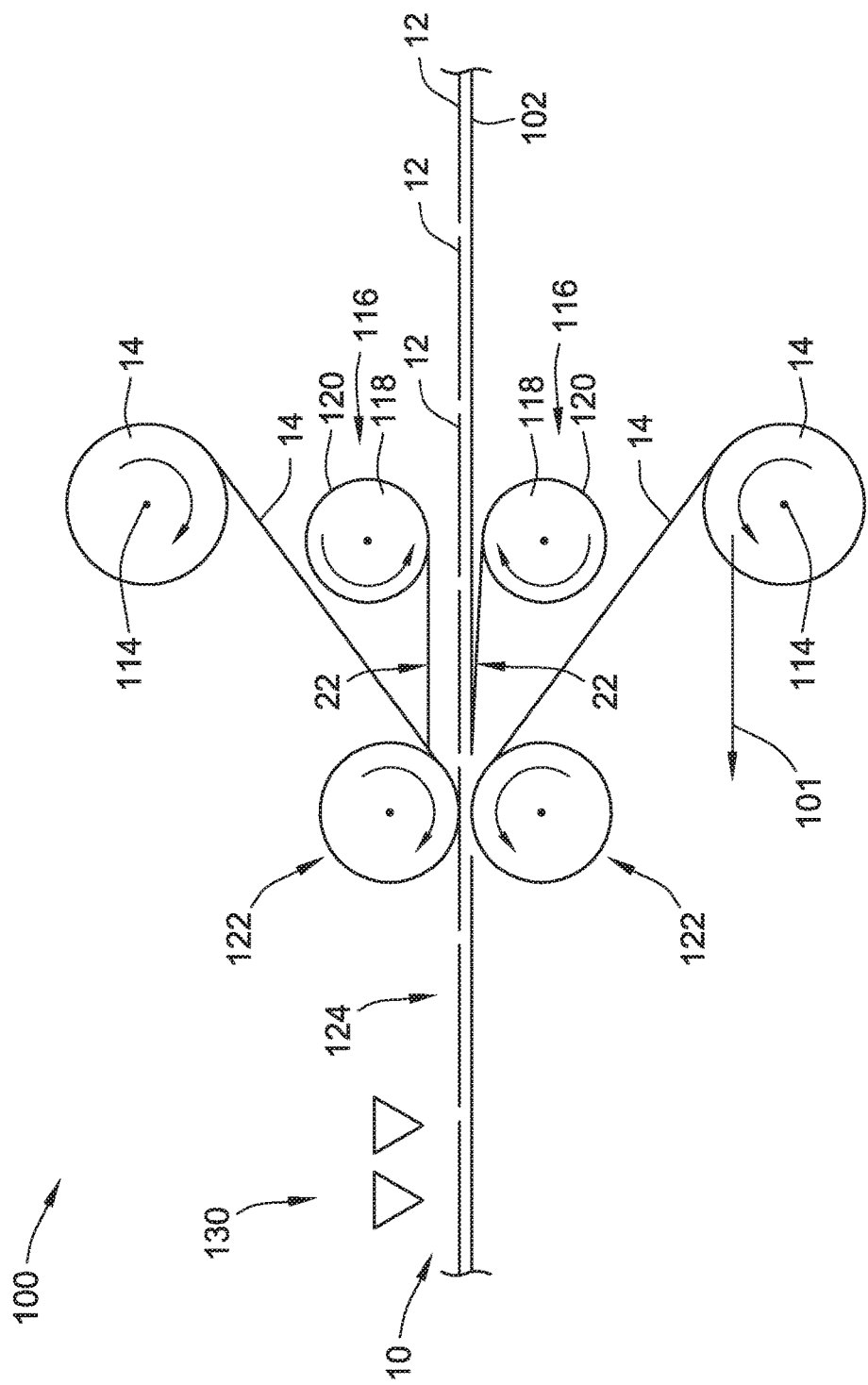
FIG. 2 is schematic representation of the laminating process.

To form the partition 10 from the inner layer 12 and outer layer(s) 14, a lamination process is used. The lamination process can use adhesives to attach the outer layer(s) 14 to the inner layer 12 including wet adhesives, pressure sensitive adhesives, and heat activated adhesives, and most preferably pressure-sensitive adhesives. In one preferred form of the invention, the process is generally shown and represented in FIG. 2. Individual (pre-cut) inner layer sheets 12 having substantially the same length and width dimensions of the partition are fed from a first supply station into a lamination machine 100 directly or on a flatbed conveyor 102 end-to-end and adjacent one another in a machine direction indicated by arrow 101. Outer layer sheets 14 have an adhesive coating covered by a backing substrate 22 and are stored in a second supply station in a continuous web on a supply roll 14. In a preferred form of the invention, two supply rolls are provided one for each outer layer 14. Each of the supply rolls are mounted on a spindle or axle at a supply station 114 for rotational movement about an axis through the supply roll.

A pair of backing-removal stations 116 are provided each having a roller 118 mounted for rotational movement and having an outer surface 120 for contacting and removing the backing substrate 22 from the outer layer 14 to expose the adhesive layer. The two adhesive-exposed layers are fed into a pair of nip rollers 122 where the adhesive layers are pressed against opposed surfaces of the inner layer 12 to form a five-layered structure 124. The nip rollers or other rollers can be provided to provide heat if a heat sensitive adhesive is used. The three-layered structure 124 is then fed through a die cutting station 130 where it is cut to the proper dimension with excess material outer layer material 14 removed and a slot 16 is cut to form the partition.

While not shown, it is recognized that several series of drive rollers or pull rollers can be employed to move the sheets, laminates, and/or laminated sheets into, through, and out of the laminating machine.

The partitions 10 are then moved to a stacker and eventually interconnected to one another to form partitions. Laminators up to 60" have been found to work but it is recognized that larger or smaller laminators can be used.

The terms "first," "second," "upper," "lower," "top," "bottom," "above," "below," etc. are used for illustrative purposes to associate relative positioning of elements to other elements only and are not intended to limit the embodiments in any way. The term "plurality" as used herein is intended to indicate any number greater than one, either disjunctively or conjunctively as necessary, up to an infinite number. The terms "joined," "attached," and "connected" as used herein are intended to put or bring two elements together so as to form a unit, and any number of elements, devices, fasteners, etc. may be provided between the joined or connected elements unless otherwise specified by the use of the term "directly" and/or supported by the drawings.

While the specific embodiments have been illustrated and described, numerous modifications come to mind without significantly departing from the spirit of the invention, and the scope of protection is only limited by the scope of the accompanying Claims.

I claim:

1. A process for forming a partition on a lamination machine having a plurality of stations comprising:
   providing at a first supply station a source of a plurality of individual sheets of an inner layer of an expanded polyolefin having sufficient dimensional stability not to fold under its own weight, having opposed outer surfaces and having a length and width dimension substantially the same as the partition;
   providing at a second supply station a source of a first continuous roll of a first multi-layered sheet material having a first substrate layer, a first adhesive layer and a first backing layer;
   providing at a third supply station a source of a second continuous roll of a second multi-layered sheet material having a second substrate layer, a second adhesive layer and a second backing layer;
   mounting the first continuous roll on a first spindle at the second supply station for rotational movement of the first roll about an axis of the first roll;
   mounting the second continuous roll on a second spindle at the third supply station for rotational movement of the second roll about an axis of the second roll;
   pulling a portion of the first multi-layered sheet material from the second supply station into contact with a roller to remove the first backing layer to expose the first adhesive layer to provide a first two-layer structure;
   pulling a portion of the second multi-layered sheet material from the third supply station into contact with a roller to remove the second backing layer to expose the second adhesive layer to provide a second two-layer structure;
   pulling the first two-layered structure between a pair of nip rollers;
   pulling the second two-layered structure between the pair of nip rollers;
   feeding a plurality of the individual sheets of the inner layer toward the pair of nip rollers where the first two-layered structure is pressed onto one of the outer surfaces of the individual sheet and the second two-layered structure is pressed onto the opposed outer surface of the individual sheet to form a five-layered structure;
   pulling the five-layered structure to a cutting station where excess material of the first two-layered structure and the second two-layered structure are removed; and
   pulling the five-layered structure to a cutting station where a notch is cut in the five-layered structure to form the partition.

2. The method of claim 1 wherein the first substrate layer is of a material selected from the group consisting of polyamides, polyesters, polyolefins, polyvinyl chloride, and polycarbonate.

3. The method of claim 2 wherein the polyolefin is selected from the group consisting of homopolymers and copolymers of ethylene, propylene, butylene, hexene, heptene, octene, and combinations thereof.

4. The method of claim 1 wherein the first substrate material is a high density polyethylene.

5. The method of claim 2 wherein the first adhesive is of a type selected from the group consisting of wet adhesives, pressure sensitive adhesives, and heat activated adhesives.

6. The method of claim 1 wherein the first substrate layer is a nonwoven material.

7. The method of claim 6 wherein the nonwoven material is spunbond.

8. The method of claim 6 wherein the nonwoven material is spunlaced.

9. The method of claim 6 wherein the nonwoven material a needlepunch.

10. The method of claim 6 wherein the nonwoven material is finished to have a characteristic selected from the group consisting of flame retardancy, high liquid absorbency, liquid repellency, high tensile strength, bacterial resistance, abrasion resistance, softness, and combinations of the same.

11. The method of claim 1 wherein the first substrate is a brushed polyester.

12. The method of claim 1 wherein the first substrate is an oriented polyolefin.

13. The method of claim 1 wherein the first substrate is an oriented polypropylene.

14. The method of claim 13 wherein the second substrate is an oriented polypropylene.

15. The method of claim 1 wherein the step of feeding a plurality of the individual sheets comprises providing a flatbed conveyor and feeding the individual sheets in an end-to-end fashion on the conveyor.

16. The method of claim 1 further comprising a heated roller.

17. The method of claim 16 wherein the pair of nip rollers are heated.

* * * * *